United States Patent [19]

Ocheltree et al.

[11] Patent Number: 5,043,973
[45] Date of Patent: Aug. 27, 1991

[54] DISK CENTERING METHOD AND APPARATUS FOR CENTERING DISKS FOR DISK DRIVES

[75] Inventors: Robert Ocheltree, Sunnyvale; Paul Alexander, San Jose; John P. Ross, Cupertino, all of Calif.

[73] Assignee: Conner Peripherals, Inc., San Jose, Calif.

[21] Appl. No.: 559,690

[22] Filed: Jul. 30, 1990

[51] Int. Cl.$^5$ .................. G11B 23/00; G11B 25/04
[52] U.S. Cl. .................... 369/270; 369/271
[58] Field of Search ............... 369/270, 271, 34, 36, 369/38, 75.2; 360/99.08, 99.12, 98.07, 98.08, 99.03, 97.01, 99.05; 29/406; 33/643, 632, 644, 520; 76/79

[56] References Cited

U.S. PATENT DOCUMENTS

| | | | |
|---|---|---|---|
| 4,385,335 | 5/1983 | Kiemer | 360/137 |
| 4,481,552 | 11/1984 | Dona et al. | 360/133 |
| 4,563,824 | 1/1986 | Baun | 33/568 |
| 4,628,379 | 12/1986 | Andrews et al. | 360/77.05 |
| 4,644,792 | 2/1987 | Fietzke | 73/461 |
| 4,797,873 | 1/1989 | Nobutani | 360/99.08 |
| 4,825,314 | 4/1989 | Maekawa et al. | 369/271 |
| 4,839,880 | 6/1989 | D'Alayer D'Arc | 369/75.2 |
| 4,910,624 | 3/1990 | Peeters | 360/133 |
| 4,933,927 | 6/1990 | Ross | 369/270 |

Primary Examiner—Stuart S. Levy
Assistant Examiner—Kenneth B. Wells
Attorney, Agent, or Firm—Fliesler, Dubb, Meyer & Lovejoy

[57] ABSTRACT

A method of centering a disk on the rotational axis of a motor, the motor having a hub protruding into a center hole in the disk, and the disk having an outer diameter and an inner diameter, is provided. The method includes the steps of (a) placing a contact element in contact with the outer diameter of the disk; (b) applying a damping force and a spring force to said contact element, said damping force and said spring force, urging said contact element towards said rotational axis, wherein the magnitude of said damping force is greater than the magnitude of said spring force, and said spring force is of insufficient amplitude to move said disk with respect to said hub; and (c) rotating said contact element to rotate said disk. Also provided is an apparatus for centering a disk on the rotational axis of a motor having a hub protruding into a center hole of the disk, the disk being loosely fixed to the hub and having an outer diameter and an inner diameter defining the center hole. The apparatus includes means for contacting the outer diameter of the disk, and for rotating the disk. The apparatus further includes shock absorber means, coupled to the means for contacting, for applying a first force and a second force toward the rotational axis of the motor, where the first force being constantly applied and is of insufficient amplitude to move the disk with respect to the hub, the second force urges the means for contacting in the direction of the rotational axis when the disk is rotated to generate a third force in the direction away from the rotational axis, the second force being greater than the first force and of sufficient amplitude to move the disk with respect to the hub.

24 Claims, 6 Drawing Sheets

DISK CENTERING METHOD AND APPARATUS FOR CENTERING DISKS FOR DISK DRIVES

CROSS REFERENCE TO RELATED APPLICATION/PATENT

"DISK CENTERING METHOD AND APPARATUS FOR CENTERING DISKS FOR DISK DRIVES", application Ser. No. 07/315,148, filed Feb. 24, 1990, inventor John P. Ross, now U.S. Pat. No. 4,933,927.

The above cited Patent is hereby incorporated by reference.

BACKGROUND OF THE INVENTION

1. Field of the Invention

The present invention relates to a method of centering a single disk or multiple disks for a disk drive on the hub of a disk drive motor and an apparatus for performing disk centering.

2. Description of the Related Art

Motors in disk drives usually spin the disk mounted on the motor at approximately 3600 rpm. The sensitivity of disk drives to vibration requires that the disk and motor assembly be balanced so that the motor assembly does not vibrate beyond a specified degree during operation of the disk drive. The disk and motor are usually balanced with weighted screws threaded into the motor or by using other weighing methods.

Figure 1A:
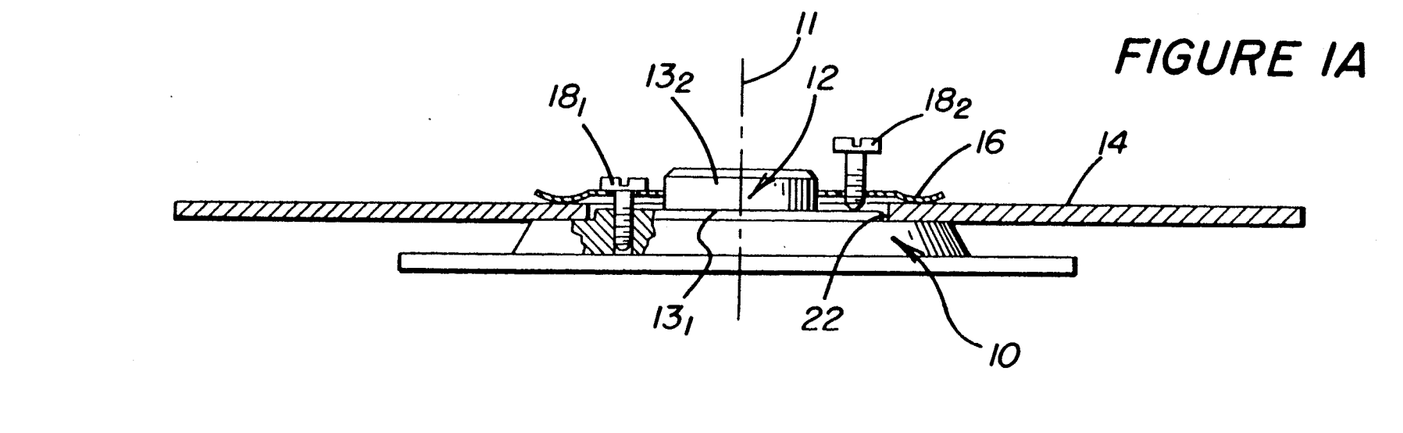
FIG. 1A is a partial, cross-sectional view of a disk drive motor, having a disk mounted thereon, showing a prior art method of balancing a disk on the drive motor.

FIG. 1A illustrates a disk drive motor 10 having a first type of hub 12. Hub 12 has a first hub portion $13_1$ which protrudes into the center hole of disk 14 and a second hub portion $13_2$ which protrudes through the center hole of disk 14 and through disk clamp 16. Disk 14 is secured to motor 10 by disk clamp 16 and screws $18_{1-2}$. Disk 14 has a ring-like shape with an outer diameter 20 and an inner diameter 22; inner diameter 22 defines the center hole of disk 14.

If weighted screws are to be added for balancing, more holes than are necessary to hold disk 14 in place are provided in the hub 12 of motor 10 and the weighted screws are threaded into the extra holes to balance disk 14. In addition, screws 18, which are usually all of the same weight, may be replaced with screws of varying weights during the balancing process.

As used herein, "hub" means the rotating portion of a disk drive motor, or a rotating spindle or shaft attached to a motor.

The balancing procedure is conventionally performed by spinning the disk, detecting an out-of-balance condition, providing screw(s) of the appropriate weight in the appropriate hole(s) in the hub, and repeating the procedure until the disk is balanced. Alternatively, weight can be added in different manners (e.g., by placing lead tape on the hub 12 or disk 14).

Several problems are associated with the weighted balancing procedure. First, the balancing procedure is time and labor intensive, and extremely difficult to automate. Second, the efforts associated with the balancing procedure are often wasted because of poor disk placement relative to the hub, particularly first hub portion $13_1$ which protrudes into the center hole in disk 14. If the disk 14 is not centered on the hub 12, a portion of inner diameter 22 of disk 14 is closer to first hub portion $13_1$ than the remaining portions of inner diameter 22; in some cases a portion of inner diameter 22 may even contact first hub portion $13_1$.

Further, the clearance between inner diameter 22 of disk 14 and first hub portion $13_1$ is on the order of 0.0004 to 0.008 inches, and therefore manually locating disk 14 to prevent contact with first hub portion $13_1$ is difficult if not impossible. The problems associated with centering the outer diameter 20 of the disk 14 relative to the axis 11 of motor 10 are compounded by runout of motor 10 and non-concentricity of outer diameter 20 and inner diameter 22 of disk 14.

Thermal expansion of hub 12 and/or thermal contraction of disk 14 will cause a portion of hub 12 and disk 14 to contact one another, if they are not already in contact. Contact between disk 14 and first hub portion $13_1$ causes disk 14 to move relative to hub 12, placing disk 14 in an out-of-balance condition. This thermal expansion/contraction problem is enhanced by the different coefficients of thermal expansion of the disk material and the hub material, e.g., the aluminum-based disk and steel-based motor hub, and the difficulty in placing disk 14 on hub 12 without contact between first hub portion $13_1$ and disk 14.

One solution to this problem, conceived by one of the inventors of the present invention, is disclosed in U.S. Pat. No. 4,933,927, ("the '927 patent") inventor John P. Ross. The method and apparatus disclosed in the '927 patent include placing an element in contact with outer diameter 20 of the disk 14, moving the element towards the rotational axis of the motor until a portion of the inner diameter contacts hub 12, and simultaneously rotating disk 14 and hub 12 while moving the contact element away from the rotational axis of the motor until the contact element no longer contacts the disk.

Figure 1B:
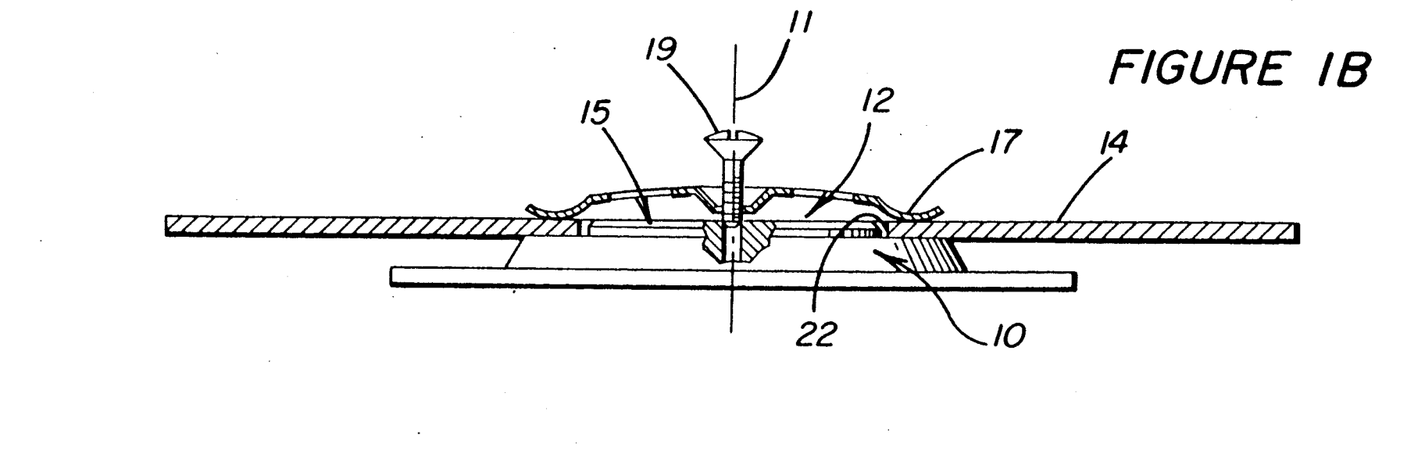
FIG. 1B is a partial, cross-sectional view of a disk drive motor, having a disk mounted thereon, showing a disk clamp which may be utilized with the present invention.

In the method and apparatus of the '927 patent, a drive head having a number of pins is lowered onto disk clamp 16, which includes a number of holes for receiving the drive head pins. The method and apparatus disclosed in the '927 patent thus cannot easily be adapted to a single screw disk clamp such as shown in FIG. 1B, wherein single screw disk clamp 17 is attached to a second type of hub 15 by a single center screw 19. Single screw disk clamp 17 substantially reduces time and labor involved in attaching disk 14 to drive motor 10.

With the method disclosed in the '927 application, there is some difficulty in centering disks on drives utilizing more than one disk. Generally, multiple disks are arranged in a stacked configuration about the same rotational axis of the drive motor. In such a configuration, the disks are spaced apart by spacing elements that are themselves in contact with the disk. In such drives, difficulty has arisen in centering a number of disks at the same time because movement of any one of the disks causes the spacer element to move, thereby shifting the position of one or more of the other disks.

SUMMARY OF THE INVENTION

It is, therefore, an object of the present invention, to balance a disk for a disk drive by centering the disk with respect to the rotational axis of a motor.

A further object of the present invention is to automate the disk centering and/or balancing processes.

Another object of the present invention is to provide a method of centering a disk with respect to the rotational axis of a motor so that the outer diameter of the disk has a runout which is less than a specified value.

Another object of the present invention is to provide a disk balancing process which does not require the addition of weight to the motor and disk assembly.

A further object of the present invention is to provide a disk centering process that overcomes the deficiencies of previous disk centering methods with respect to centering multiple disks about a single axis.

A further object of the present invention is to provide a disk centering method that operates independent of the pre-centering position of the disk in relation to the rotational axis of the motor.

A further object of the present invention is to provide a disk centering method which provides greater accuracy than previous disk centering methods.

A method, in accordance with the present invention, of centering a disk on the rotational axis of a motor, the motor having a hub protruding into a center hole in the disk, the disk having an outer diameter and an inner diameter, includes the steps of (a) placing a contact element in contact with the outer diameter of the disk; (b) applying a damping force and a spring force to said contact element, said damping force and said spring force, urging said contact element towards said rotational axis, wherein the magnitude of said damping force is greater than the magnitude of said spring force, and said spring force is of insufficient amplitude to move said disk with respect to said hub; and (c) rotating said contact element to rotate said disk.

An apparatus for centering a disk on the rotational axis of a motor having a hub protruding into a center hole of the disk, the disk being loosely fixed to the hub and having an outer diameter and an inner diameter defining the center hole, comprises means for contacting the outer diameter of the disk, including means for rotating said disk, and shook absorber means, coupled to said means for contacting, for applying a first force and a second force toward the rotational axis of the motor, said first force being constantly applied and being of insufficient amplitude to move said disk with respect to said hub, said second force urging said means for contacting in the direction of said rotational axis when said disk is rotated to generate a third force in the direction away from said rotational axis, said second force being greater than said first force and of sufficient amplitude to move said disk with respect to said hub.

DESCRIPTION OF THE PREFERRED EMBODIMENT(S)

The disk centering method and apparatus for centering disks for disk drives in accordance with the present invention will be described with reference to FIGS. 1-8.

Figure 2A:
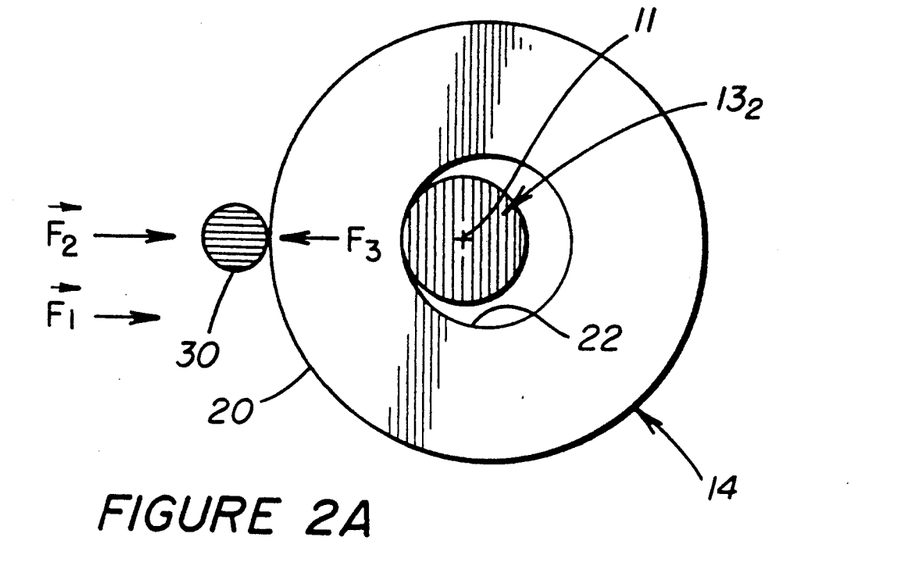
FIGS. 2A and 2B are plan views of a disk and the hub of a disk drive motor for describing the method of the claimed invention.
Figure 2B:
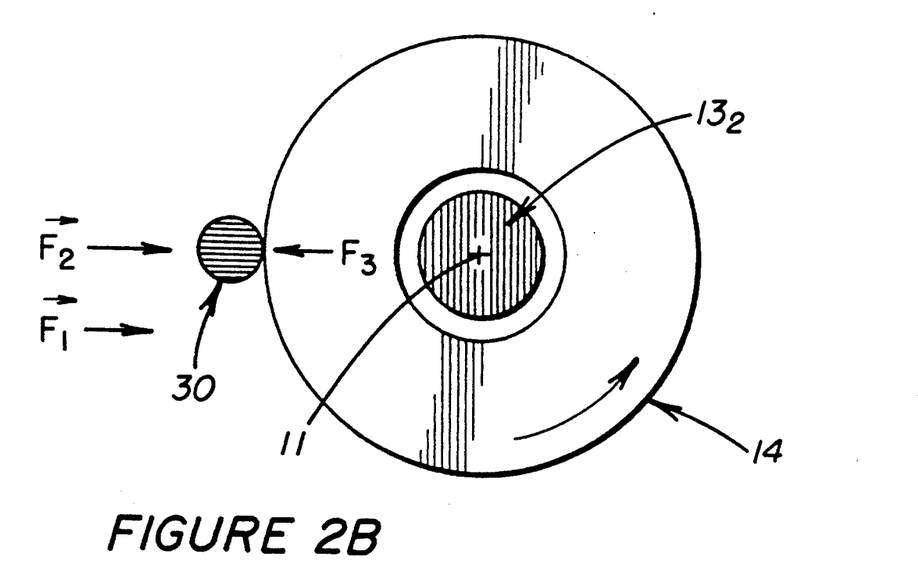

The purposes of the method of the present invention include centering the outer diameter 20 of disk 14 on axis 11 of motor 10, allowing for space between the hole in disk 14 and hub 12, (particularly first hub portion $13_1$) and/or balancing the combined structure of motor 10 and disk 14. The centering operation of the present invention is dependent on the trueness of outer diameter 22 of disk 14, and the balancing operation of the present invention is dependent on the trueness of outer diameter 22 and the balance of motor 10. The disk centering method, as shown in FIGS. 2A-B, is performed in the following manner. The disk centering method will be described with reference to hub 12 and disk clamp 16, as shown in FIG. 1A, however, it should be understood that the method works equally well with hub 15 and disk clamp 17, as shown in FIG. 1B. Disk 14 is mounted on hub 12 with a disk clamp 16, as shown in FIG. 1A. Then, disk 14 is loosely fixed to motor 10. As used herein, "loosely fixed" means that disk 14 may be moved relative to hub 12 by the application of a small force, but is sufficiently secured so that the disk 14 will not move under normal circumstances, for example, during rotation of the disk 14 and hub 12. A contact element 30 is brought into contact with the outer diameter 20 of disk 14. In FIG. 2A, the outer diameter 20 of disk 14 is closest to first hub portion $13_1$ at the point where outer diameter 22 and contact element 30 are in contact, e.g., the point which has the shortest effective radius between rotational axis 11 and outer diameter 20. However, contact element 30 may be brought into contact with outer diameter 20 at any point, having any radius relative to first hub portion $13_1$. As will be understood from the following discussion, the nature of forces $\vec{F}_1$ and $\vec{F}_2$ will ensure that contact element 30 begins the centering process when disk 14 is in the position shown in FIG. 2A.

Contact element 30 is driven to rotate, for example, in a counterclockwise direction when in contact with disk 14, thereby driving disk 14 into rotation about rotational axis 11 in a clockwise direction. Force $\vec{F}_1$ is a spring force having insufficient magnitude to move the disk with respect to the hub portion $13_1$, but of sufficient magnitude to maintain contact element 30 in engagement with disk 14 Force $\vec{F}_2$ is a damping force which acts on contact element 30 only when disk 14 provides force $\vec{F}_3$ against contact element 30. Force $\vec{F}_3$ is provided when those portions of outer diameter 20 with a larger effective radius with respect to rotational axis 11 than the radius defined by the point where contact element 30 contacts disk 14 and rotational axis 11 are rotated towards contact element 30. Force $\vec{F}_3$ is related to the rotational velocity of disk 14 and the eccentricity of the disk with respect to rotational axis 11.

Force $\vec{F}_2$ is of variable magnitude and responsive to force $\vec{F}_3$. The magnitude of force $\vec{F}_2$ is sufficient to provide a damping force in the direction of the rotational axis, such that when outer diameter 20 is rotated past the contact element 30, force $\vec{F}_2$ causes disk 14 to move toward rotational axis 11 to center the disk.

Figures 3, 5:
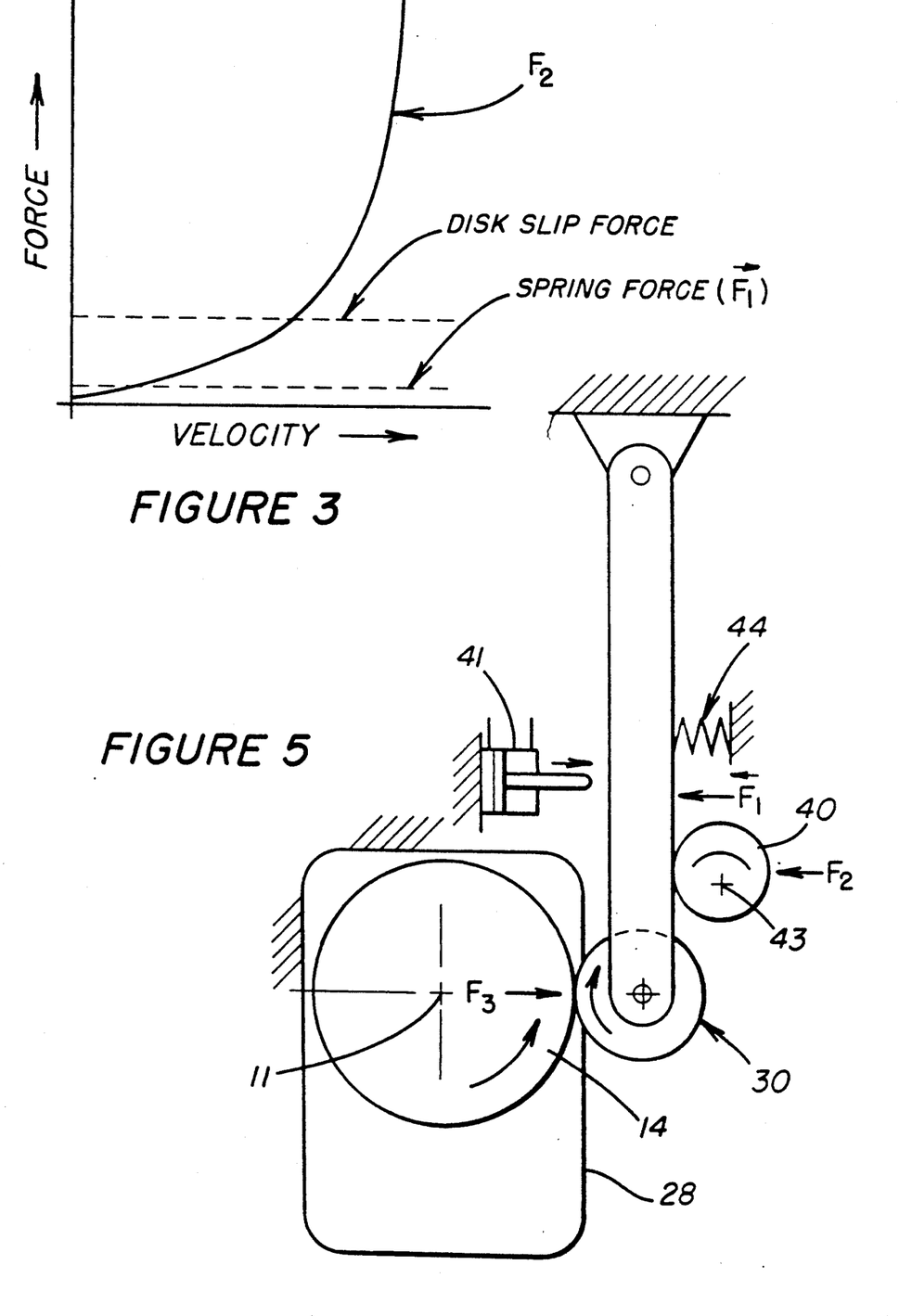
FIG. 3 is a graph illustrating the damping force applied to the disk versus the velocity of the force in the direction away from a rotational axis of a disk drive motor generated by rotation of a disk not centered about a rotational axis.
FIG. 5 is a top level diagram of a second apparatus for performing disk centering in accordance with the method of the present invention.

As shown in FIG. 3, the magnitude of force $\vec{F}_2$ is proportional to the square of the velocity of contact element 30 in the direction away from rotational axis 11. As those regions of outer diameter 20 which are the greatest distance from rotational axis 11 rotate towards contact element 30, the velocity of the movement of contact element 30 away from the rotational axis 11 will increase, thereby providing greater damping force $\vec{F}_2$ to move disk 14 towards rotational axis 11. The greater the magnitude of $\vec{F}_2$, the more the pre-load force (disk slip force) provided by disk clamp 16,17 is overcome, and disk 14 is shifted into a centered position about rotational axis 11. Rotation of disk 14 and interaction of forces $\vec{F}_2$ and $\vec{F}_3$ continues until such time as an equilibrium between damping force $\vec{F}_2$ and outward force $\vec{F}_3$ is reached as shown in FIG. 2B. It can be seen that force $\vec{F}_1$ is minimal with respect to force $\vec{F}_2$. Eventually, the magnitude of damping force $\vec{F}_2$ and outward force $\vec{F}_3$ will equal zero. At this point, disk 14 will be centered about rotational axis 11. Utilizing this method, the disk 14 can be rotated for a relatively infinite amount of time to achieve the centering of disk 14 with respect to rotational axis 11.

If inner diameter 22 is substantially concentric with outer diameter 20, the entire circumference of inner diameter 22 of disk 14 will be equally spaced from first hub portion $13_1$. Providing a space between inner diameter 22 and hub 12 avoids the thermal expansion/contraction problem.

The disk 14 is rotated at rotational speeds varying from approximately 1,500 to approximately 2,500 rpm; however, smaller and larger numbers of revolutions per minute may be utilized, provided that the relationships of disk clamp force, and the forces acting on contact element 30, are adjusted accordingly. The inventors of the present invention have determined, through trial and error, that the optimal velocities utilized in the method are as follows: approximately 2,400 rpm for a 3½" form factor disk drive, and approximately 1600 rpm for a 22" form factor disk drive.

Figure 4:
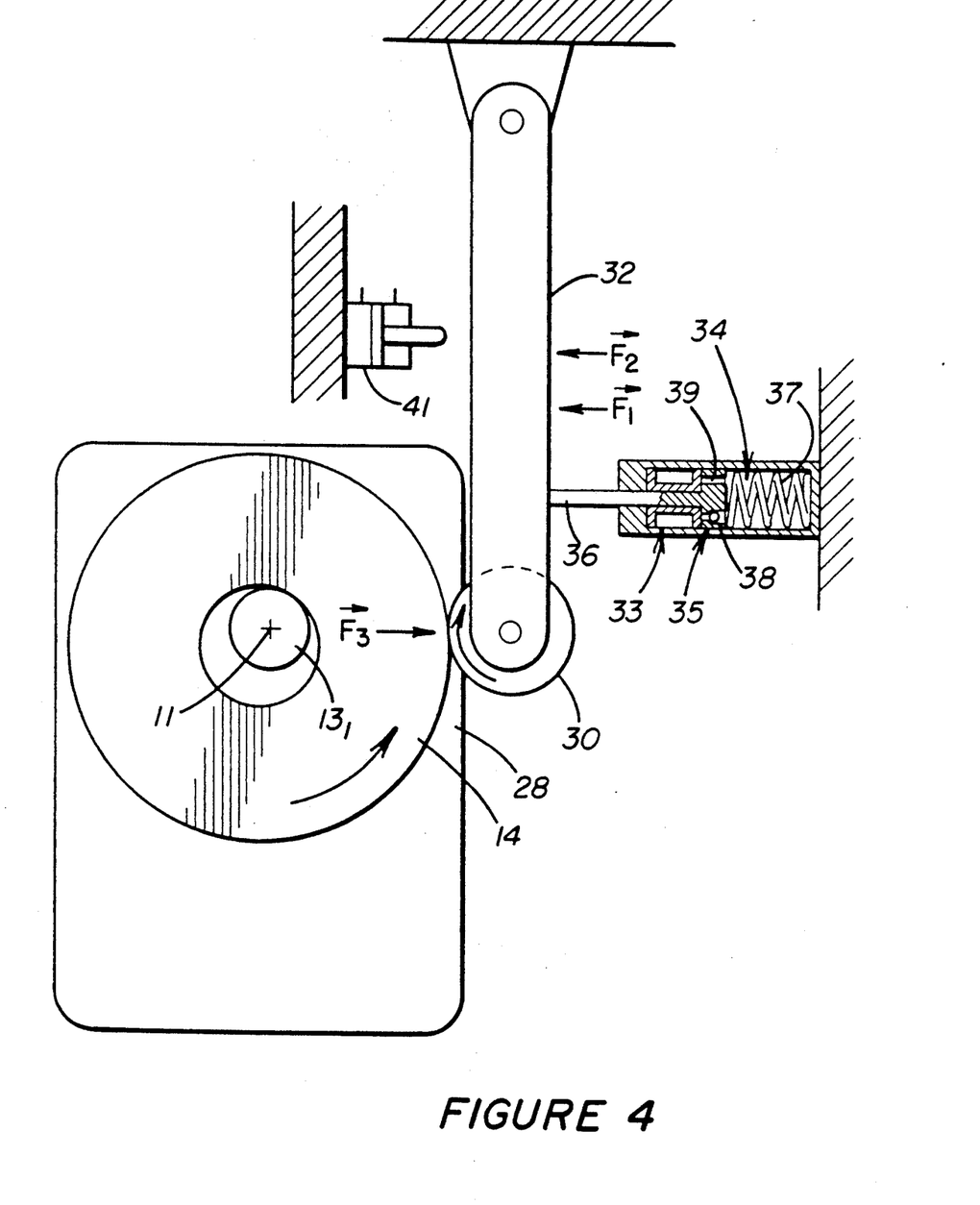
FIG. 4 is a top level diagram of an apparatus in accordance with the present invention for disk centering.

The inventors have determined that a disk for a 3½ inch form factor disk drive can be out-of-balance if the center of gravity is approximately 0.00025 inches or greater off center with respect to axis 11. The present method can relieve centering of the disk about the rotational axis 11 within 0.00025 inches. FIG. 4 is a top level diagram of a first apparatus of performing the method of the present invention. Motor 10 is mounted on disk drive base 28 prior to performing the centering/balancing operation so as to allow base 28 to be used to support motor 10.

FIG. 4 shows the contact element 30 rotatably mounted on a support arm 32 which includes a means for driving contact element 30 to spin contact element 30 when in contact with disk 14, thereby rotating disk 14. Forces $\vec{F}_1$ and $\vec{F}_2$ are provided by shock absorber 35, which includes piston 36, spring 37, one-way check valve 38, and hydraulic valve 39. Shock absorber 35 acts as a biased hydraulic dampener to provide the spring force $\vec{F}_1$ and the hydraulic force $\vec{F}_2$ having a minimum ratio of approximately 0.5:99.5, based on a maximum damping force $\vec{F}_2$. This ratio will vary with piston speed as set out in FIG. 3.

Shock absorber 35 includes a cylindrical housing 31 divided into two hydraulic chambers 33 and 34, containing a hydraulic fluid such as oil. During movement of piston rod 36 under force $\vec{F}_3$, one-way check valve 38 inhibits fluid flow and, as fluid is forced thorough hydraulic valve 39, heat is generated and a pressure drop ensues, thereby providing damping force $\vec{F}_2$. When force $\vec{F}_3$ is removed, spring 37 provides force $\vec{F}_1$ as one way check valve 38 unseats and allows fluid flow between chambers 33 and 34.

In one embodiment of the invention, force $\vec{F}_2$ provided by shock absorber 35 is adjustable to provide varying degrees of magnitude for resistive force $\vec{F}_2$ with respect to movement of disk 14 and outward force $\vec{F}_3$. (See FIGS. 6-9).

Also shown in FIG. 4 is retraction cylinder 40 which may be utilized to force support arm 20 to a position where contact element 30 is free of disk 14.

FIG. 5 shows a second apparatus for performing the method of the present invention. FIG. 5 shows an apparatus which utilizes eccentric element 40 in place of shock absorber means 35 of the apparatus shown in FIG. 3. Spring 44 is utilized to provide force $\vec{F}_1$ and eccentric element 40, rotating about axis 43, provides force $\vec{F}_2$ to maintain contact element 30 abutting disk 14. Again, force $\vec{F}_1$ provided by spring 44 provides contact between the contact element 30 and the disk 14; however, the magnitude of force $\vec{F}_1$ is not great enough to shift disk 14 in relation to rotational axis 11. Force $\vec{F}_2$, provided by eccentric element 40, may be implemented by rotation of eccentric element 40 by a synchronized motor.

The preferred embodiment of the apparatus for centering disks in accordance with the above-described method is illustrated in FIGS. 6-9. The preferred apparatus includes a base table 50 having mounted thereon the disk mounting assembly 60, pivot arm assembly 70 including contact element 30, shock absorber assembly 80, and clamp hold-down assembly 90.

Figure 6:
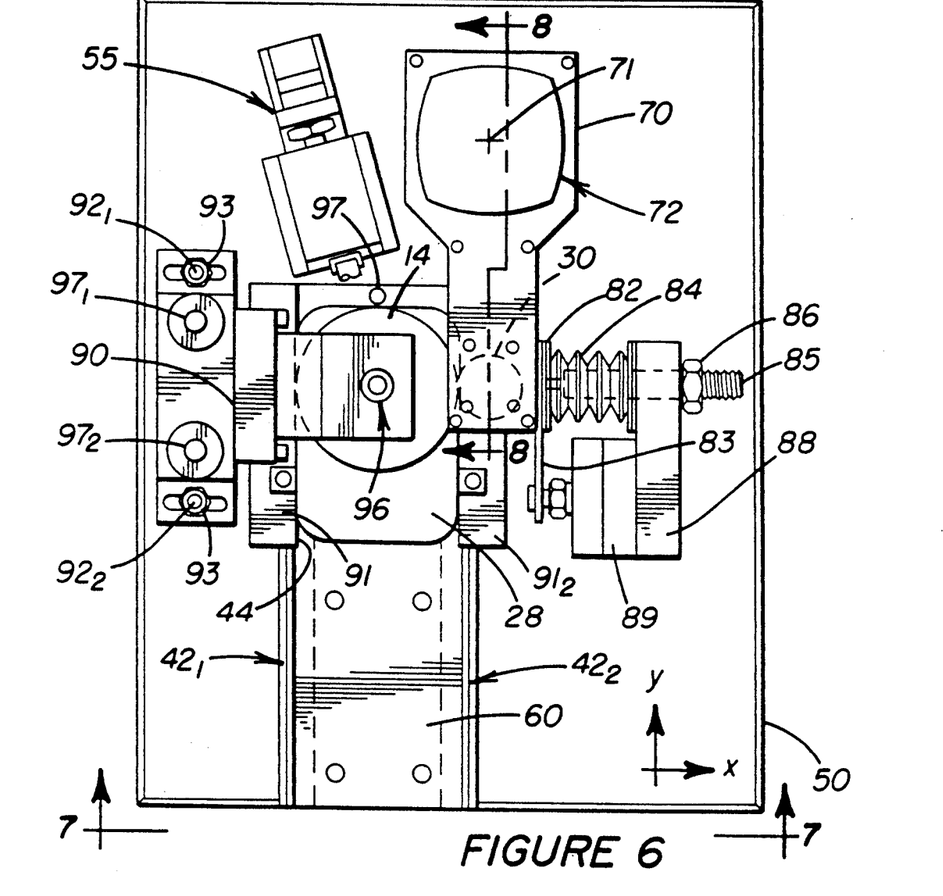
FIG. 6 is a top level view of an apparatus for centering a disk on a disk drive in accordance with the present invention.

Disk mounting assembly 60 is mounted to base table 50. Disk drive base 28 for mounting disk 14 slides into the apparatus on rails $42_{1-2}$. Guide blocks $91_1$ and $91_2$ ensure positioning of drive base 28 along the x-axis, and dowel pin 97 acts as a ensures position stop along the y-axis. Blocks $91_1$ and $91_2$ are mounted to air cylinders $62_1$ and $62_2$. Block $91_1$ includes a lip 44, to secure disk 14 and base 28 securely in place. Clearly, many different structures may be utilized to secure base 28 to the disk centering apparatus.

Clamp hold-down assembly 90 is mounted to vertical slider rods $97_1$ and $97_2$. Two shock absorbers $92_1$ and $92_2$, such as Model TK 21-3 manufactured by Endyne, Inc., 7 Center Drive, Orchard Park, N.Y., 14127, are secured in place by jam nuts 93 and act to cushion engagement of O-ring 95 to disk clamp 16,17. Clamp hold-down assembly 90 includes a clamp head 94 linearly mounted on arm 93 by O-ring 95, mounts to head 94 and engages disk clamp 16,17. This allows the clamp hold-down assembly 90 to engage disk 14, and specifically, the disk clamp (16,17), without damaging the disk. Arm 93 includes hole 96 which, when the apparatus is used with single screw disk clamp 17, allows tightening of mounting screw 19 before disk 14 is removed from the apparatus. Clamp hold-down assembly 90, mounted on posts $97_1$ and $97_2$, may be manually raised and lowered along the z-axis when mounting and unmounting drive base 28, or may be mounted on pneumatic slides $97_1$ and $97_2$, which may be selected to raise or lower assembly 90 to seat on disk 14. Disk 14 is loosely fixed to hub 12 by the downward force of lightly tightening the clamp hold-down screws ($18_1$, $18_2$, 19) on the disk clamp (16,17). A pre-load force of approximately 3-4 lbs. (in the case of a 3.5" disk) is provided by the lightly tightened screws and this force is sufficient to create enough friction so that disk 14 will rotate with hub 12 while allowing disk 14 to move laterally during the centering-/balancing process. This force pre-load also holds disk 14 in place while center screw 19 is tightened to securely fix disk 14 to hub 12, as discussed above.

Also included on base 56 is a dial indicator assembly 55 for monitoring alignment of disk 14.

Figure 7:
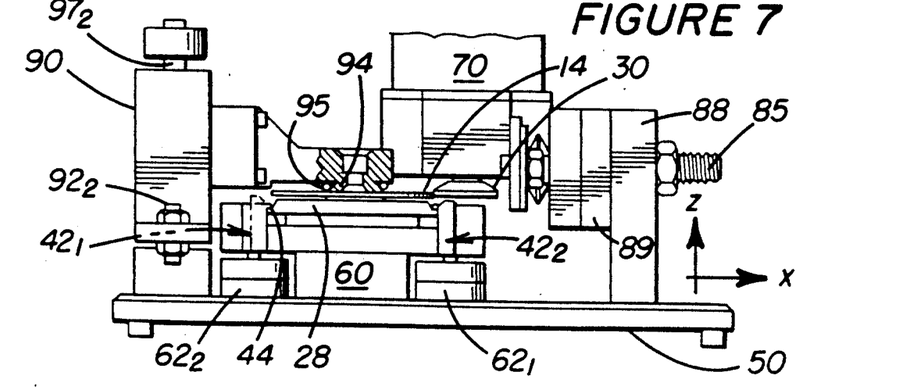
FIG. 7 is a view along line 7—7 in FIG. 6.

Pivot arm assembly 70 is rotatably mounted about pivot point 71 to allow contact element 30 to be brought into contact with disk 14. Pivot arm assembly 70 is coupled to shock absorber assembly 80 as, for example, by bench head screws coupling flange bellow 82, which secures the shock absorber bellow 84 to the casing of the pivot arm assembly 70 and bracket 83. Bracket 83 is further coupled to air cylinder 89, secured to mounting 88, to retract pivot arm assembly 70 and contact element 30 during drive installation and removal. A shook absorber 85 is secured to mounting 88 by jam nut 86. Shock absorber 85 comprises, for example, Model OEM 0.25 manufactured by Endyne, Inc. Shock absorber 85 provides a coil spring force of approximately 0.8 pounds extended and 1.7 pounds compressed ($F_1$) In addition, shock absorber 85 provides a maximum energy of 30 in-lbs. per cycle, and a maximum of 125 lbs. of shock force.

Figure 8:
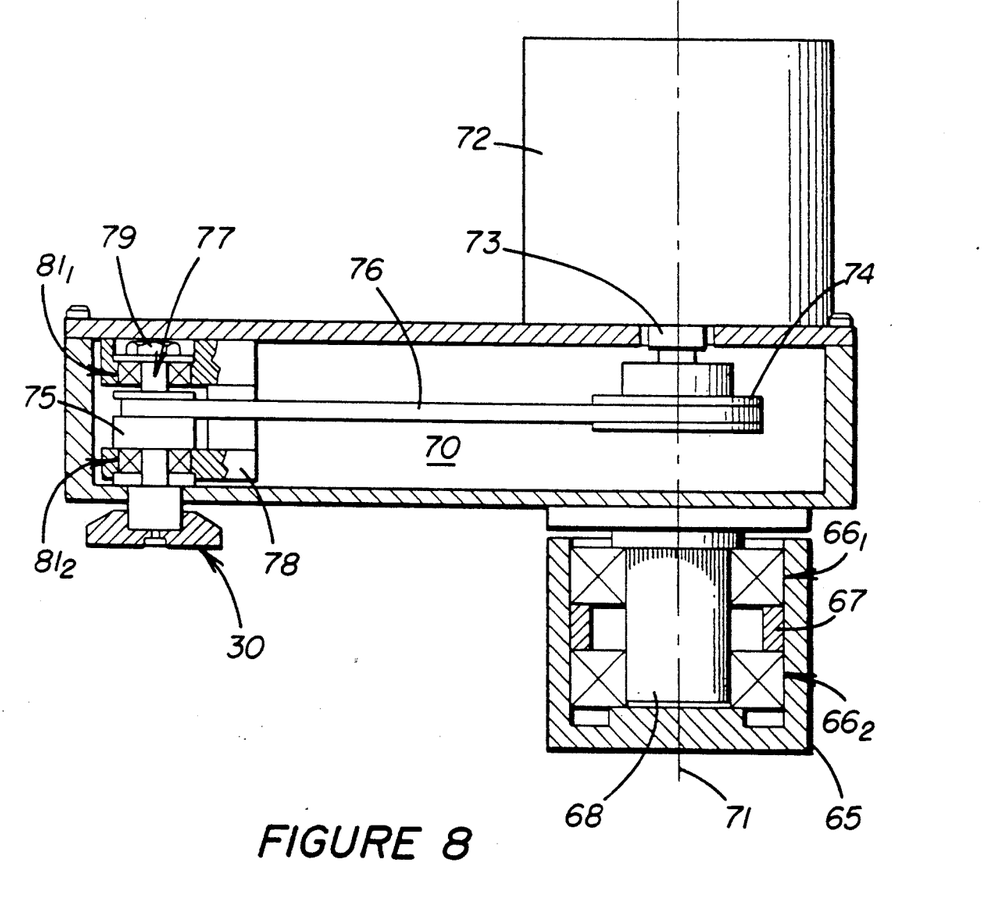
FIG. 8 is a cutaway view along line 8—8 in FIG. 6.

As shown in FIG. 8, pivot arm assembly 70 includes means for propelling contact element 30 to rotate disk 14 when contact element 30 is in contact with disk 14. Motor assembly 72 provides rotational drive to shaft 73, which is coupled to first pully 74. First pully 73 is interconnected to second pully 75 by belt 76. Second pully 75 is coupled to shaft 77, which is surrounded by bearings $81_1$, and $81_2$ and secured to mounting structure 78 by jam nut 79.

Pivot arm assembly 70 is affixed to base 50 by assembly mounting 65, which includes bearings $66_1$ and $66_2$, surrounding pivot arm assembly shaft 68, seated in assembly mounting 65. A spacer 67 is provided between bearings $66_1$, and $66_2$.

Contact element 30 is precisely machined from a material which is hard enough to be machined and to retain its shape, but soft enough so that it does not damage disk 14. The material for contact element 30 may be, for example, Delrin. A precision bearing 94 is used to mount contact element 30 to shaft portion 90 of eccentric 52. Other low-friction, non-abrading elements may be used to contact outer diameter 20. In operation, disk 14 is loosely secured to base 28 and is mounted on the centering apparatus. As noted above, the preload force on disk 14 is provided by the lightly tightened disk clamp screw(s) ($18_1$, $18_2$, 19). Contact element 30 is brought into contact with disk 14 and rotated to spin disk 14 to begin the centering process. The process proceeds, as discussed above, for approximately 3-5 seconds. Pivot arm assembly 70 is then retracted to move contact element 30 away from disk 14 to allow disk 14 to stop. Clamp hold down assembly 90 is then lowered onto disk 14 to secure disk 14 in position while clamp hold down screws $18_1$, $18_2$, 19 are tightened to secure disk 14 on base 28.

One major advantage of using the present method is that there is no need to accurately locate the axis of the disk drive and the contact element because disk 14 is propelled by providing a rotational drive to contact element 30. This feature has the advantage over the prior art in that the disk drive need not be precisely mounted below a drive element as was the case in the prior art. Further, there is no need to precisely align the drive head of the centering apparatus with the disk clamp. Still further, the accuracy of the method and apparatus is not dependent on the aoouracy of the drive motor. In addition, the use of a number of contact elements and a number of shock absorbers may be utilized to center a drive having a plurality of disks.

These and other features and advantages of the centering/balancing method and the apparatus for performing same in accordance with the present invention will be apparent to those of ordinary skill in the art from the foregoing description and the drawings. Further, the following claims are intended to cover all modifications and equivalents falling within the scope of the invention.

What is claimed is:

1. A method of centering a disk on the rotational axis of a motor, the motor having a hub protruding into a center hole in the disk, the disk having an outer diameter and an inner diameter, the inner diameter defining the center hole, comprising the steps of:
   (a) placing a contact element in contact with the outer diameter of the disk;
   (b) applying a damping force and a spring force to said contact element, the damping force and the spring force urging the contact element towards the rotational axis to contact the disk, wherein the damping force has a magnitude which is greater than the magnitude of the spring force, and the magnitude of the spring force is of insufficient amplitude to move the disk with respect to the hub; and
   (c) rotating the contact element to rotate the disk with a rotational velocity sufficient to create a force in the direction opposite to that of the damping force.

2. The method of claim 1 wherein said damping force and said spring force are applied by placing a shock absorber in contact with said contact element.

3. The method of claim 1 wherein the damping force is applied only when rotating the disk causes an outward force having a direction opposite to that of the damping force.

4. The method of claim 3 wherein said damping force is proportional to the square of the velocity of said outward force.

5. The method of olaim 1 wherein the minimum ratio of said spring force to said damping force is approximately 0.5:99.5, the ratio being dependent on the velocity of the movement of the contact element away from the disk.

6. The method of claim 1 wherein said damping force is provided by an eccentric element which is in contact with said contact element, said eccentric element being rotated about an axis, said rotation of said eccentric element providing said damping force.

7. The method of claim 1 wherein said contact element is rotated to generate a speed of rotation of said disk in a range of approximately 1,500-2,500 rpm.

8. A method of centering a disk on the rotational axis of a motor, the motor including a hub, the disk having an outer diameter and an inner diameter, defining a center hole, comprising the sequential steps of:
   (a) loosely fixing the disk to the hub so that force of a first magnitude is required to move the disk with respect to the hub;
   (b) placing a contact element in contact with the outer diameter of the disk;

(c) placing a shock absorber in contact with said contact element at a position opposite of the disk, said shock absorber for providing a damping force and a spring force both having a direction toward said rotational axis, wherein the magnitude of said damping force is greater than the magnitude of said spring force, and the magnitude of said spring force is less than the first magnitude; and (d) rotating said contact element to rotate said disk concurrently with said step (c) for a period sufficient to cause said disk to become centered about the rotational axis of the motor.

9. The method of claim 8, wherein said damping force and said spring force are applied by placing a shock absorber in contact with said contact element.

10. The method of claim 8 wherein said damping force is applied only when rotating the disk causes an outward force having a direction opposite to that of said damping force.

11. The method of claim 10 wherein said damping force is proportional to the square of the velocity of said contact element in the direction of said outward force.

12. The method of claim 8 wherein the minimum ratio of said spring force to said damping force is approximately 0.5:99.5.

13. The method of claim 8 wherein said damping force is provided by an eccentric element which is in contact with said contact element, said eccentric element being rotated about an axis, said rotation of said eccentric element providing said damping force.

14. The method of claim 8 wherein said contact element is rotated to generate a speed of rotation of said disk in a range of approximately 1,500–2,500 rpm.

15. The method of claim 8 wherein the force provided by loosely fixing said disk is greater than about 3 lbs.

16. The method of claim 8 further including the steps of:

(e) removing said contact element from contact with the outer diameter of said disk; and (f) securing the disk to the hub by clamping the disk in place.

17. A method of centering a plurality of disks on the rotational axis of a motor, the motor having a hub protruding into a center hole in each of the plurality of disks, each disk having an outer diameter and an inner diameter, each of the inner diameters of the disks defining the center hole of the disk, wherein a plurality of spacers is interposed between said disks, comprising the steps of:

(a) placing at least one contact element in contact with the outer diameter of each disk;

(b) placing at least one shock absorber in contact with said at least one contact element at a position opposite of the disk, said shock absorber for providing a damping force and a spring force for urging said contact element towards the rotational axis, wherein said resistive force is greater than said spring force, and said spring force is of insufficient magnitude to move said disk with respect to said hub; and (c) rotating said contact element to rotate each said disk concurrently with step (b) for a period sufficient to center the disk about the rotational axis.

18. An apparatus for centering a disk on the rotational axis of a motor having a hub protruding into a center hole of the disk, the disk being loosely fixed to the hub and having an outer diameter and an inner diameter defining the center hole, comprising:

means for contacting the outer diameter of the disk and for rotating said disk; and shock absorber means, coupled to said means for contacting, for applying a first force and a second force in the direction toward said rotational axis, said first force being constantly applied and being of insufficient amplitude to move said disk with respect to said hub, said second force being applied in response to a third force having a direction away from said rotational axis, said third force being generated when said disk is rotated, said second force being greater than said first force and of sufficient amplitude to move said disk with respect to said hub.

19. The apparatus of claim 18 wherein said means for contacting the outer diameter of the disk comprises a contact element and said means for rotating said disk comprises a powered pivot arm having said contact element mounted thereon, said pivot arm including a motor assembly for driving said contact element to rotate.

20. The apparatus of claim 18 wherein said shock absorber means comprises of a cylinder having hydraulic fluid contained therein, a piston having a piston arm protruding from one end of said cylinder, said piston including a one-way check valve and a hydraulic valve for selectively allowing flow of said hydraulic fluid between portions of the chamber formed on the inside of said cylinder, and a spring mounted at a position opposite of said piston arm.

21. The apparatus of claim 20 wherein the minimum ratio of said first force to said second force is 0.5:99.5.

22. The apparatus of claim 18 wherein said third force is generated when said means for rotating said disk causes said disk to rotate and portions of the outer diameter of said disk having a larger effective radius with respect to the rotational axis of the drive motor are rotated past said means for contacting.

23. An apparatus for centering a disk on the rotational axis of a motor mounted to the base plate of a disk drive, the motor including a hub, the disk having an outer diameter and an inner diameter defining a center hole, comprising:

means for supporting the base plate and the motor of the disk drive;

means for contacting the outer diameter of the disk, including means for rotating the disk with respect to the hub of the disk drive at a selected rotational velocity; and means, coupled to said means for contacting, for providing a resistive force against said means for contacting when said disk is rotated such that the distance of said outer diameter of said disk at the point on said outer diameter which is in contact with said means for contacting is greater that the distance from the rotational axis to said point on said outer diameter.

24. An apparatus for centering a plurality of disks on the rotational axis of a motor mounted to the base plate of a disk drive, the motor including a hub, each of the disks having an outer diameter and an inner diameter defining a center hole, comprising:

means for supporting the base plate and the motor of the disk drive;

means for contacting the outer diameter of each of the disks, including means for rotating each of the disks with respect to the hub of the disk drive at a selected rotational velocity; and means, coupled to said means for contacting, for providing a damping force against said means for contacting when each disk is rotated such that the distance of said outer diameter of each disk at the point on said outer diameter which is in contact with said means for contacting is greater that the distance from the rotational axis to said point on said outer diameter.

* * * * *

UNITED STATES PATENT AND TRADEMARK OFFICE
CERTIFICATE OF CORRECTION

PATENT NO. : 5,043,973
DATED : August 27, 1991
INVENTOR(S) : Robert Ocheltree, Paul Alexander, John P. Ross It is certified that error appears in the above-identified patent and that said Letters Patent is hereby corrected as shown below:

Col. 5, line 40, "22" should read --2-1/2--

Col. 6, line 64, after --disk 14.--, before --Disk 14-- should be paragraph break Col. 7, line 18, "shook" should read --shock--

Col. 7, line 21, "0.25" should read --.25--

Col. 7, line 48, after --20.-- before --In-- should be paragraph break

Col. 8, line 4, "aoouracy" should read --accuracy--

Col. 6, line 39: --ensures-- should be deleted

Col. 10, line 57: --that-- should be "than"

Col. 12, line 2: --that-- should be "than"

Signed and Sealed this

Sixteenth Day of November, 1993

Attest:

BRUCE LEHMAN

Attesting Officer

Commissioner of Patents and Trademarks